(12) United States Patent
Lee et al.

(10) Patent No.: US 7,835,541 B2
(45) Date of Patent: Nov. 16, 2010

(54) APPARATUS, METHOD, AND MEDIUM FOR DETECTING FACE IN IMAGE USING BOOST ALGORITHM

(75) Inventors: Sujin Lee, Yongin-si (KR); Jungbae Kim, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1207 days.

(21) Appl. No.: 11/171,277

(22) Filed: Jul. 1, 2005

(65) Prior Publication Data

US 2006/0126938 A1    Jun. 15, 2006

(30) Foreign Application Priority Data

Dec. 9, 2004    (KR) .................... 10-2004-0103672

(51) Int. Cl.
*G06K 9/00* (2006.01)

(52) U.S. Cl. .................. 382/103; 382/115; 382/118; 382/173; 382/190; 382/224; 382/225; 382/226; 382/227

(58) Field of Classification Search ............ 382/103, 382/115, 118, 173, 190, 225, 224, 226, 227
See application file for complete search history.

(56) References Cited

U.S. PATENT DOCUMENTS 4,577,235 A * 3/1986 Kannapell et al. .......... 382/176
2001/0026631 A1 * 10/2001 Slocum et al. .............. 382/115
2002/0102024 A1 * 8/2002 Jones et al. ................. 382/225
2002/0122596 A1 * 9/2002 Bradshaw .................... 382/226
2003/0108244 A1 * 6/2003 Li et al. ....................... 382/227
2005/0094854 A1 * 5/2005 Kim ............................ 382/118

* cited by examiner

*Primary Examiner*—Vikkram Bali
*Assistant Examiner*—Daniel Zeilberger
(74) *Attorney, Agent, or Firm*—Staas & Halsey LLP

(57) ABSTRACT

An apparatus, method, and medium for detecting a face in an image using classifiers generated by a boost algorithm are provided. The apparatus may include an image dividing unit dividing a black and white image into sub-windows; a sub-window detection unit detecting a sub-window corresponding to a face image in the divided sub-windows using the front part of the cascade of the classifiers and storing the sub-window detected as the face image; and a post-processing unit verifying whether each of sub-windows included in a group among a plurality of groups into which stored sub-windows are grouped is the face image using the number of child detections in each group and the latter part of the cascade of classifiers, integrating the sub-windows in the group according to the result of the verification, and outputting the result of the integration as the face image included in the black and white image.

27 Claims, 14 Drawing Sheets
(4 of 14 Drawing Sheet(s) Filed in Color)

APPARATUS, METHOD, AND MEDIUM FOR DETECTING FACE IN IMAGE USING BOOST ALGORITHM

CROSS-REFERENCE TO RELATED APPLICATIONS

This application claims the benefit of Korean Patent Application No. 10-2004-0103672, filed on Dec. 9, 2004, in the Korean Intellectual Property Office, the disclosure of which is incorporated herein in its entirety by reference.

BACKGROUND OF THE INVENTION

1. Field of the Invention

The present invention relates to image detection usable in mobile nodes (e.g. mobile phones), robots, or gates, and more particularly, to an apparatus, method, and medium of detecting a face in an image using a boost algorithm.

2. Description of the Related Art

When face detection is used in, for example, a robot, the robot localizes a person's call, turns toward the person, captures an image including the person, detects the face of the person in the captured image, and recognizes the person based on the detected face. Recognizing a person's face includes inspecting whether the person's face is present in the image and may also include detecting the position of the face in the image. To recognize the face in the image, it is necessary to detect the face in the image.

A conventional face detection method using an adaptive boost (AdaBoost) leaning technique is disclosed in U.S. Patent Publication No. 2002/0102024, published on Aug. 1, 2002. This conventional method has problems in that the large face-like negative regions cannot be filtered out with small fixed threshold for the number of child detections around a face and the small true face regions can be filtered out with large fixed threshold since the child detections have a tendency to increase in number in proportion to the size of the detected regions, wherein the child detections are the detected sub-windows within a specified location.

Another conventional face detection method was introduced by Yong Ma and Xiaoqing Ding ["Robust Real-Time Face Detection Base on Cost-Sensitive AdaBoost Method", Proceedings of 2003 International Conference on Multimedia and Expo, Vol. 2, pp. 921-924, 2003]. A still another conventional face detection method was introduced by Stan Z. Li and ZhenQiu Zhang ["FloatBoost Learning and Statistical Face Detection", IEEE Transactions on Pattern and Machine Intelligence. Vol. 26, No. 9, pp. 1112-1123, September 2004]. These conventional methods have a problem in that they must train the classifier in every stage newly.

Another conventional face detection method is disclosed in Korean Patent Application No. 2004-0061417, entitled "AdaBoost Face Detection Using Skin Color". This conventional method has a problem in that it is sensitive to lighting since it uses skin color.

SUMMARY OF THE INVENTION

Additional aspects and/or advantages of the invention will be set forth in part in the description which follows and, in part, will be apparent from the description, or may be learned by practice of the invention.

The present invention provides an apparatus for detecting a face in an image using a boost algorithm, thereby increasing the accuracy of face detection.

The present invention also provides a method of detecting a face in an image using a boost algorithm, thereby increasing the accuracy of face detection.

The present invention also provides a medium for detecting a face in an image using a boost algorithm, thereby increasing the accuracy of face detection.

According to an aspect of the present invention, there is provided an apparatus for detecting a face in an image using classifiers generated by a boost algorithm, the apparatus including an image dividing unit dividing a black and white image into sub-windows; a sub-window detection unit detecting a sub-window corresponding to a face image in the divided sub-windows using the front part of the cascade of the classifiers and storing the sub-window detected as the face image; and a post-processing unit verifying whether each of sub-windows included in a group among a plurality of groups into which stored sub-windows are grouped is the face image using the number of child detections in each group and the latter part of the cascade of the classifiers, integrating the sub-windows in the group according to the result of the verification, and outputting the result of the integration as the face image included in the black and white image, wherein the number of child detections is the number of sub-windows included in a group.

According to another aspect of the present invention, there is provided a method of detecting a face in an image using classifiers generated by a boost algorithm, the method including dividing a black and white image into sub-windows; detecting sub-windows corresponding to a face image in the divided sub-windows using the front part of the cascade of classifiers and storing the sub-windows detected as the face image; and verifying whether each of sub-windows included in a group selected from among the plurality of groups into which the stored sub-windows are grouped is the face image using a the number of child detections in each group and the latter part of the cascade of classifiers, integrating the sub-windows in the group according to the result of the verification, and determining the result of the integration as the face image included in the black and white image, wherein the number of child detections is the number of sub-windows included in a group.

According to another aspect of the present invention, there is provided at least one computer readable medium for storing instructions that control at least one processor which executes a method of detecting a face in an image using classifiers generated by a boost algorithm, wherein the method includes dividing a black and white image into sub-windows; detecting sub-windows corresponding to a face image in the divided sub-windows using the front part of the cascade of classifiers and storing the sub-windows detected as the face image; and verifying whether each of sub-windows included in a group selected from among the plurality of groups into which the stored sub-windows are grouped is the face image using a the number of child detections in each group and the latter part of the cascade of classifiers, integrating the sub-windows in the group according to the result of the verification, and determining the result of the integration as the face image included in the black and white image, wherein the number of child detections is the number of sub-windows included in a group.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
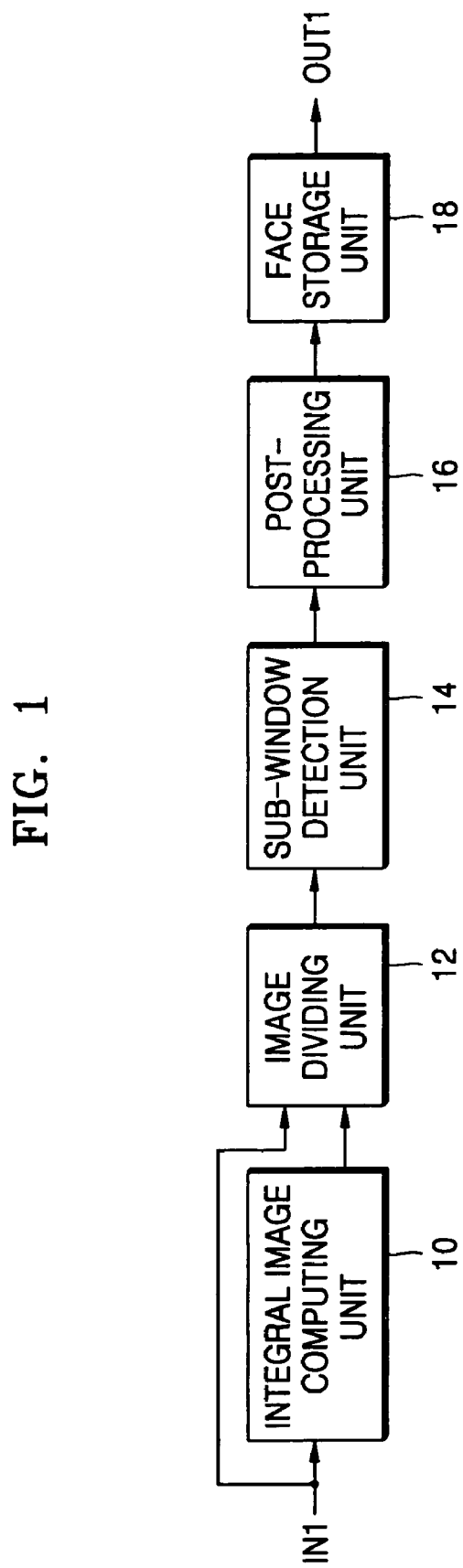
FIG. 1 is a block diagram of an apparatus for detecting a face in an image using a boost algorithm according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures, wherein like reference numerals denote like elements.

FIG. 1 is a block diagram of an apparatus for detecting a face in an image using a boost algorithm according to an exemplary embodiment of the present invention. The apparatus includes an integral image computing unit 10, an image dividing unit 12, a sub-window detection unit 14, a post-processing unit 16, and a face storage unit 18.

Figure 2:
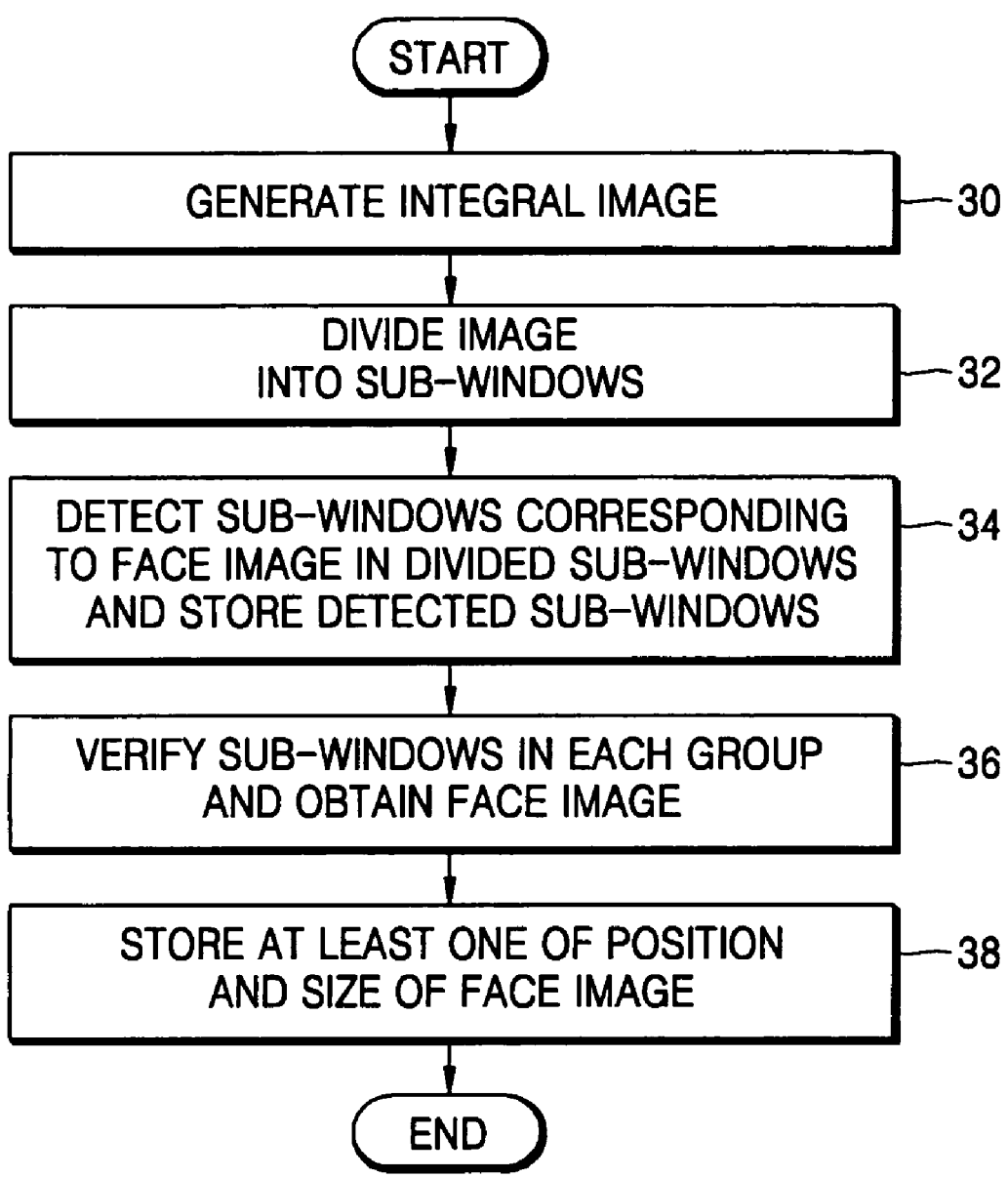
FIG. 2 is a flowchart of a method of detecting a face in an image using a boost algorithm according to an exemplary embodiment of the present invention.

FIG. 2 is a flowchart of a method of detecting a face in an image using a boost algorithm according to an exemplary embodiment of the present invention. The method includes pre-processing an image in operations 30 and 32, detecting and verifying a sub-window corresponding to a face image in operations 34 and 36, and storing face image information in operation 38.

In the apparatus and method for detecting a face in an image using a boost algorithm shown in FIGS. 1 and 2, a face is detected in an image using classifiers generated by the boost algorithm. Hereinafter, a face indicates a significant object desired to be detected in an image. For example, the face may indicate a human face or an asymmetric significant object other than a human face. The boost algorithm is disclosed in "Experiments with a New Boosting Algorithm" introduced in Machine Learning: Proceedings of the Thirteenth International Conference in 1996. An adaptive boost (AdaBoost) algorithm, a sort of boost algorithm, is disclosed in Korean Patent Application No. 2004-0061417, entitled "AdaBoost Face Detection Using Skin Color".

In operation 30, the integral image computing unit 10 shown in FIG. 1 receives a black and white image through an input terminal IN1, generates an integral image of the black and white image, and outputs the integral image to the image dividing unit 12. For example, when detecting a face in a color image, the color image is converted into a black and white image, which is input to the integral image computing unit 10.

Hereinafter, the integral image will be described with the attached drawings.

Figure 3:
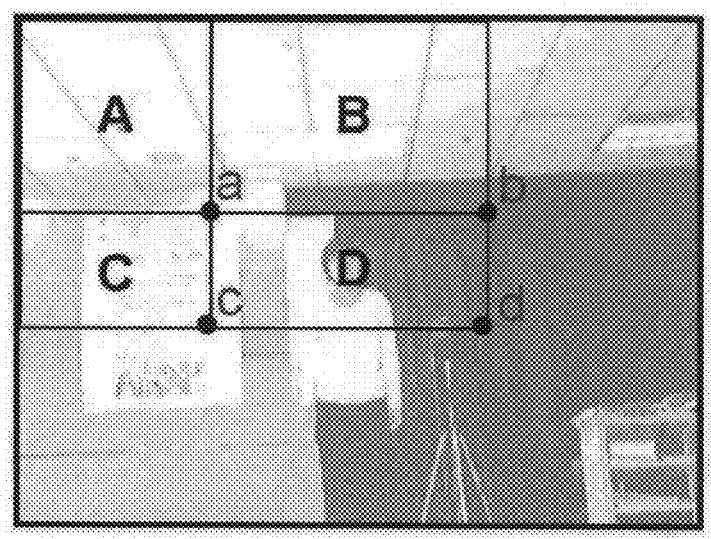
FIG. 3 is a diagram illustrating an integral image.

FIG. 3 is a diagram illustrating the integral image including four regions A, B, C, and D and four points "a", "b", "c", and "d".

An integral image of the point "a" indicates the sum of pixel values in the upper left around the point "a". In other words, the integral image of the point "a" is the sum of the pixel values of the pixels in the region A. Here, a pixel value may be a brightness level of a pixel. A squared integral image of the point "a" indicates the sum of the squares of the pixel values in the upper left around the point "a". In other words, the squared integral image of the point "a" is the sum of the squares of the respective pixels values of the pixels in the region A. When the concept of an integral image is used, it is easy to obtain the sum of pixel values in an arbitrary area of an image. In other words, when an integral image is used, the operations of classifiers can be performed fast. For example, the sum of pixel values in the area D can be obtained using Equation 1.

$$S(D)=ii(d)-ii(b)-ii(c)+ii(a), \quad (1)$$

where S(D) is the sum of the pixel values in the area (D), ii(d) is an integral image of the point "d", ii(b) is an integral image of the point "b", ii(c) is an integral image of the point "c", and ii(a) is an integral image of the point "a".

The sum of squares of the respective pixel values in the area D can be obtained using Equation 2.

$$sqsum(D)=is(d)-is(b)-is(c)+is(a), \quad (2)$$

where sqsum(D) is the sum of the squares of the respective pixel values in the area D, is(d) is a squared integral image of the point "d", is(b) is a squared integral image of the point "b", is(c) is a squared integral image of the point "c", and is(a) is a squared integral image of the point "a".

In operation 32, the image dividing unit 12 divides the integral image received from the integral image computing unit 10 into sub-windows and outputs the sub-windows to the sub-window detection unit 14.

In another exemplary embodiment of the present invention, the apparatus shown in FIG. 1 may not include the integral image computing unit 10. In this case, the method shown in FIG. 2 does not include operation 30. In this situation, in operation 32, the image dividing unit 12 divides the black and white image received through the input terminal IN1 into sub-windows and outputs the sub-windows to the sub-window detection unit 14.

Here, the size of a sub-window by which an integral image or black and white image is divided may be predetermined and also be increased at a predetermined percentage. For example, the initial size of the sub-window may be set to 20×20 pixels, and an entire image is divided by the sub-window having the initial size. Thereafter, the size of the sub-window may be increased 1.2 times, and the entire image is newly divided by the sub-window having the increased size. In this way, the image may be divided by the sub-window increasing in size until the size of the sub-window is the same as the size of the entire image. Sub-windows into which the entire image is divided may overlap each other.

Figure 4:
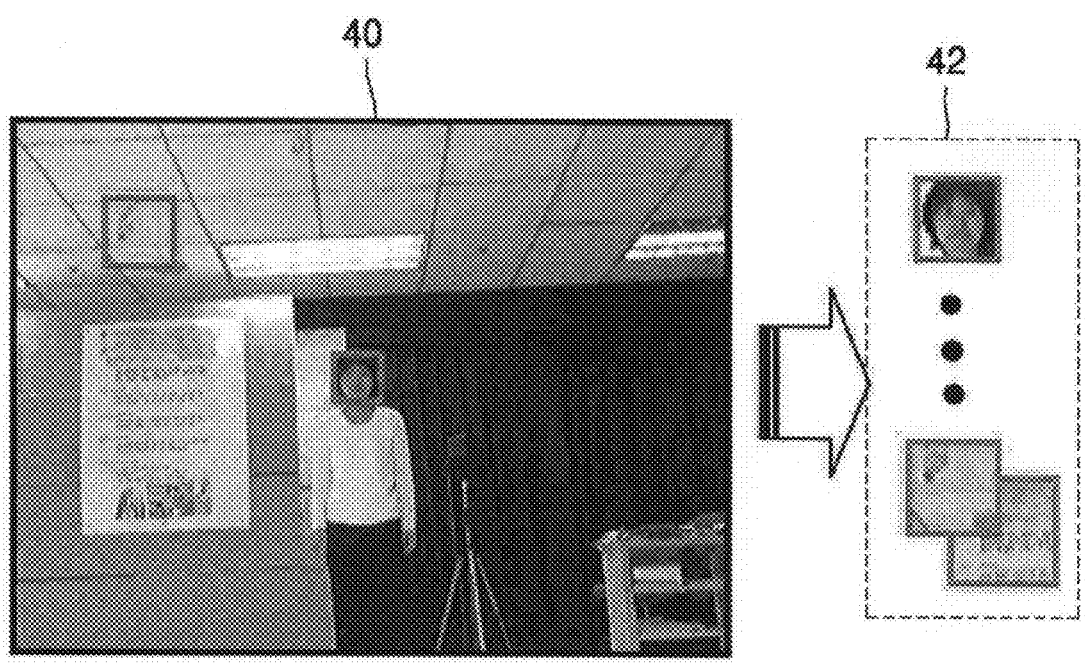
FIG. 4 illustrates sub-windows for explaining the operation of an exemplary image dividing unit shown in FIG. 2.

FIG. 4 illustrates sub-windows for explaining the operation of the image dividing unit 12. Reference numeral 40 denotes an image, and reference numeral 42 denotes sub-windows. For example, as shown in FIG. 4, the image dividing unit 12 may divide the black and white image 40 into the sub-windows 42.

In operation 34, the sub-window detection unit 14 detects sub-windows corresponding to a face image in the sub-windows received from the image dividing unit 12, using the front part of the cascade of classifiers, and stores the detected sub-windows corresponding to a face image.

Figure 5:
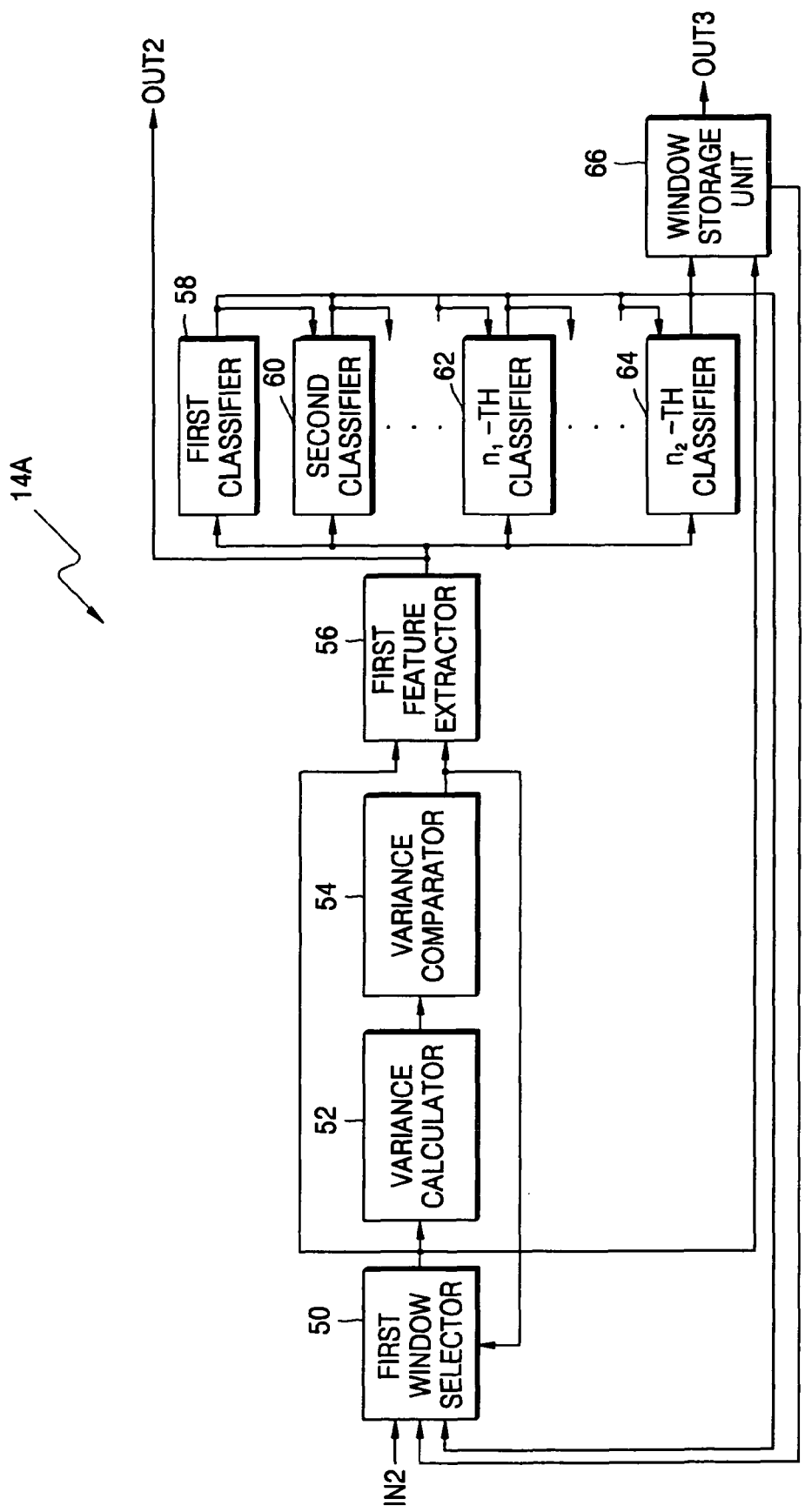
FIG. 5 is a block diagram of a sub-window detection unit shown in FIG. 1, according to an exemplary embodiment of the present invention.

FIG. 5 is a block diagram of an exemplary embodiment 14A of the sub-window detection unit 14 shown in FIG. 1, which includes a first window selector 50, a variance calculator 52, a variance comparator 54, a first feature extractor 56, first, second, . . . , $n_1$-th, . . . , and $n_2$-th classifiers 58, 60, . . . , 62, . . . and 64, and a window storage unit 66, where $n_2$ is less than the number of all classifiers, N, and $n_1$ is less than the number of the front part of the cascade of classifiers, $n_2$.

Figure 6:
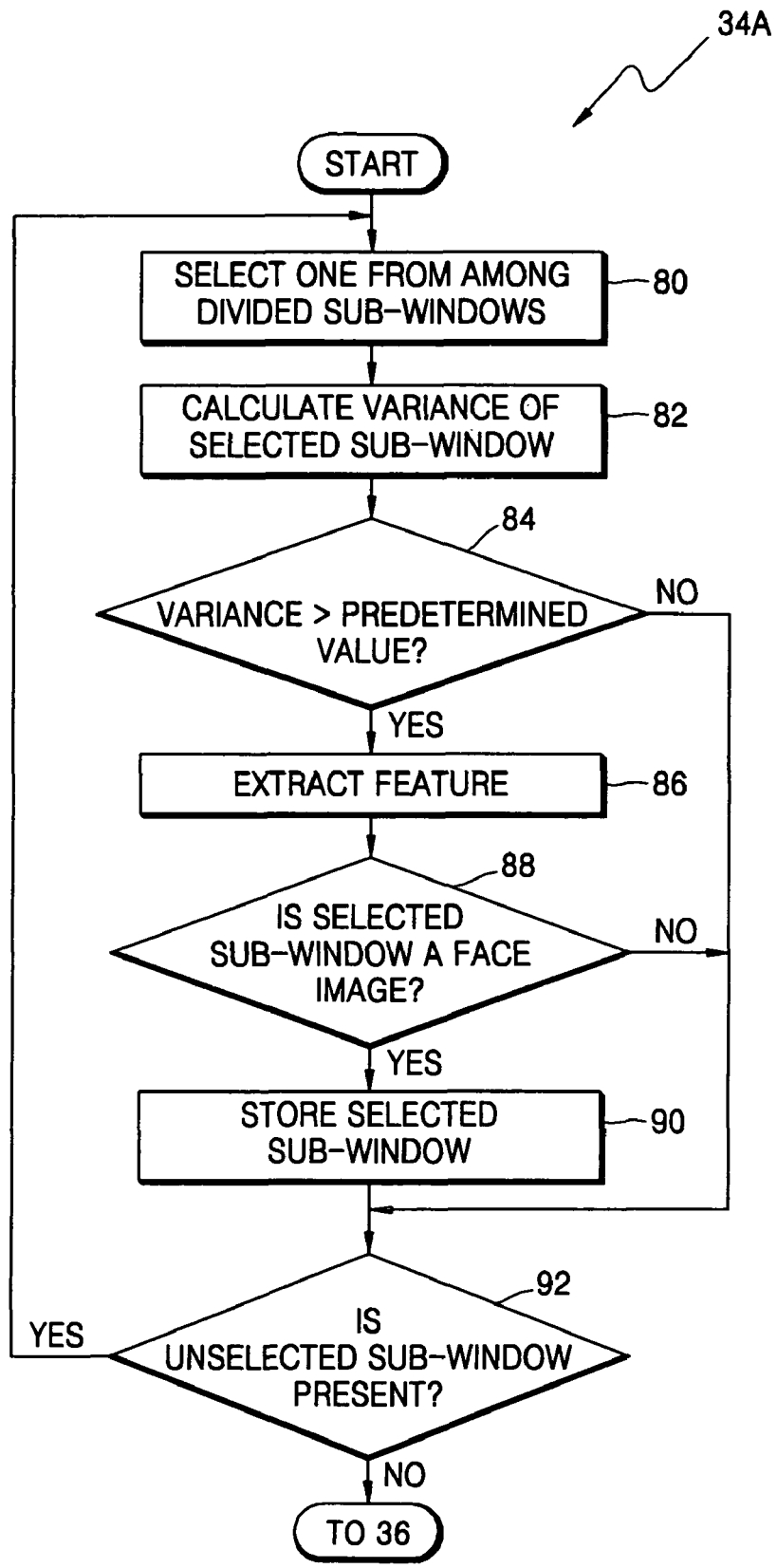
FIG. 6 is a flowchart of operation 34 shown in FIG. 2, according to an exemplary embodiment of the present invention.

FIG. 6 is a flowchart of an exemplary embodiment 34A of the operation 34 shown in FIG. 2, which includes inspecting whether each of the sub-windows is a face image in operations 80 through 92.

In operation 80, the first window selector 50 shown in FIG. 5 selects one sub-window from among the sub-windows received from the image dividing unit 12 through an input terminal IN2 and outputs the selected sub-window to the variance calculator 52 and the first feature extractor 56.

In operation 82, the variance calculator 52 calculates a variance of the sub-window selected by the first window selector 50 and outputs the variance to the variance comparator 54. The variance calculator 52 can calculate the variance using Equation 3.

$$V = \frac{sqsum}{A} - M^2, \quad (3)$$

where V is a variance, A is an area of a sub-window that is selected by the first window selector 50 and is then input to the variance calculator 52, sqsum is the sum of squares of respective pixel values in the selected sub-window and is expressed by Equation 2, and M is a mean of the selected sub-window and is expressed by Equation 4.

$$M = \frac{S}{A}, \quad (4)$$

where S is the sum of the pixel values in the sub-window selected by the first window selector 50 and may be obtained using Equation 1.

In operation 84, the variance comparator 54 compares the variance calculated by the variance calculator 52 with a predetermined value and outputs the result of the comparison to the first feature extractor 56. For example, the variance comparator 54 determines whether the variance is greater than the predetermined value. In an exemplary embodiment of the present invention, the predetermined value may be 400. In an image, most part of the background has a simple shape, and the variance of the front of the human face is always greater than 400. Since the sub-window detection unit 14A shown in FIG. 5 distinguishes a sub-window that is not a face image based on the variance of the sub-window using the variance calculator 52 and the variance comparator 54, time needed to exclude the sub-window that is not a face image can be reduced. In other words, by performing operations 82 and 84, operations 86 through 90 are not unnecessarily performed with respect to the sub-window that is not a face image.

In operation 86, the first feature extractor 56 extracts a feature of the sub-window selected by the first window selector 50 when perceiving through the comparison result of the variance comparator 54 that the variance is greater than the predetermined value, and outputs the feature to the first through $n_{2\text{-}th}$ classifiers 58 through 64 and to the post-processing unit 16 through an output terminal OUT2. However, when perceiving through the comparison result of the variance comparator 54 that the variance does not exceed the predetermined value, the first feature extractor 56 does not extract the feature of the sub-window because the likelihood that the sub-window is not a face image is very high when the variance is not greater than the predetermined value.

In operation 92, the first window selector 50 determines whether a sub-window that has not been selected by the first window selector 50 is present in the sub-windows generated by the image dividing unit 12 when perceiving through the comparison result of the variance comparator 54 that the variance does not exceed the predetermined value. When it is determined that an unselected sub-window is present, the first window selector 50 selects an unselected sub-window from among the divided sub-windows in operation 80.

In another exemplary embodiment of the present invention, the sub-window detection unit 14A shown in FIG. 5 may not include the variance calculator 52 and the variance comparator 54. In this case, operation 34A show in FIG. 6 does not include operations 82 and 84. Here, in operation 86, the first feature extractor 56 extracts the feature of the sub-window selected by the first window selector 50 and outputs the feature to the first through $n_2$-th classifiers 58 through 64 and to the post-processing unit 16 through the output terminal OUT2.

In operation 88, the first through $n_2$-th classifiers 58 through 64 determine whether the sub-window selected by the first window selector 50 is a face image based on the feature extracted by the first feature extractor 56. In other words, an x-th classifier ($1 \leq x \leq n_2$) 58, 60, . . . , 62, . . . , or 64 inspects whether the selected sub-window is a face image using the feature extracted by the first feature extractor 56. For example, the first classifier 58 receives the feature from the first feature extractor 56, inspects whether the selected sub-window is a face image using the received feature, and outputs the result of the inspection to the second classifier 60. Then, an x'-th classifier ($2 \leq x' \leq n_2$) 60, . . . , 62, . . . , or 64 operates only when a (x'−1)-th classifier classifies the sub-window as a face image. For example, the second classifier 60 operates only when the first classifier 58 determines that the sub-window is a face image. Accordingly, only when all of the first through $n_2$-th classifiers 58 through 64 perceive the sub-window as a face image, that is, when the $n_2$-th classifier 64 perceives the sub-window as a face image, the sub-window is determined as a face image in operation 88.

Each of the first through $n_2$-th classifiers 58 through 64 is a strong classifier, which includes a plurality of weak classifiers. A single weak classifier generates "1" or "−1" based on the feature extracted by the first feature extractor 56, as expressed by Equation 5.

$$h_t(x) = \begin{cases} 1, & \text{if } p_t f_t(x) < p_t \theta_t \\ -1, & \text{otherwise} \end{cases}, \quad (5)$$

where $f_t$ is the feature extracted by the first feature extractor 56, $\theta_t$ is a threshold, and $p_t$ is a parity. Here, $\theta_t$ and $p_t$ can be predetermined, and $1 \leq t \leq T$ where T is the total number of weak classifiers included in a single strong classifier. A strong classifier outputs "1" or "0" as expressed by Equation 6. Here, "1" indicates that the sub-window is a face image, and "0" indicates that the sub-window is not a face image.

$$h_t(x) = \begin{cases} 1, & \sum_{t=1}^{T} \alpha_t h_t(x) \geq \frac{1}{2} \sum_{t=1}^{T} \alpha_t \\ 0, & \text{otherwise} \end{cases}, \quad (6)$$

where α is a coefficient.

In operation 90, when the sub-window selected by the first window selector 50 is determined as a face image according to the result of the inspection by the $n_{2\text{-}th}$ classifier 64, the window storage unit 66 receives and stores the sub-window selected and outputs the result of the storing to the post-processing unit 16 through an output terminal OUT3.

When the selected sub-window is determined as not a face image according to the result of the inspections by the first through $n_{2\text{-}th}$ classifiers 58 through 64, in operation 92 the first window selector 50 determines whether an unselected sub-window is present in the sub-windows generated by the image dividing unit 12. In detail, when one of the first through $n_{2\text{-}th}$ classifiers 58 through 64 generates "0", that is, when the sub-window is determined as not a face image, the first window selector 50 performs operation 92. If it is determined that an unselected sub-window is present in the divided sub-windows, the first window selector 50 selects an unselected sub-window in operation 80.

In addition, when the window storage unit 66 informs that the sub-window is completely stored, that is, after operation 90, the first window selector 50 determines whether an unselected sub-window is present in the sub-windows received from the image dividing unit 12 in operation 92. If it is determined that an unselected sub-window is present in the divided sub-windows, the first window selector 50 selects an unselected sub-window in operation 80.

In an exemplary embodiment of the present invention, $n_2$ may be determined to satisfy the condition expressed by Equation 7.

$$D_d \leq \prod_{i=1}^{n_2} d_i, \quad (7)$$

where $D_d$ is a target detection rate for a sub-window, and $d_i$ is a detection rate of an i-th classifier ($1 \leq i \leq n_2$) among the first through $n_2$-th classifiers 58 through 64.

In another exemplary embodiment of the present invention, $n_2$ may be determined to satisfy the condition expressed by Equation 8.

$$\frac{F_d}{(1-R)} \geq \prod_{i=1}^{n_2} f_i, \quad (8)$$

where $F_d$ is a target false detection rate for a sub-window, R is a target rate at which false detection is removed, and $f_i$ is a false detection rate of the i-th classifier among the first through $n_2$-th front part of the cascade of classifiers 58 through 64.

In still another exemplary embodiment of the present invention, $n_2$ may be determined to satisfy the conditions expressed by Equations 7 and 8.

The post-processing unit 16 verifies whether each of sub-windows in a group is a face image using the number of child detections in each group and the latter part of the cascade of classifiers, integrates the sub-windows according to the result of the verification, and outputs the result of the integration as a face image included in the black and white image, in operation 36. Here, the post-processing unit 16 performs operation 36 with respect to each group composed of sub-windows detected and stored by the sub-window detection unit 14. The number of child detections is the number of sub-windows included in a group.

Figure 7:
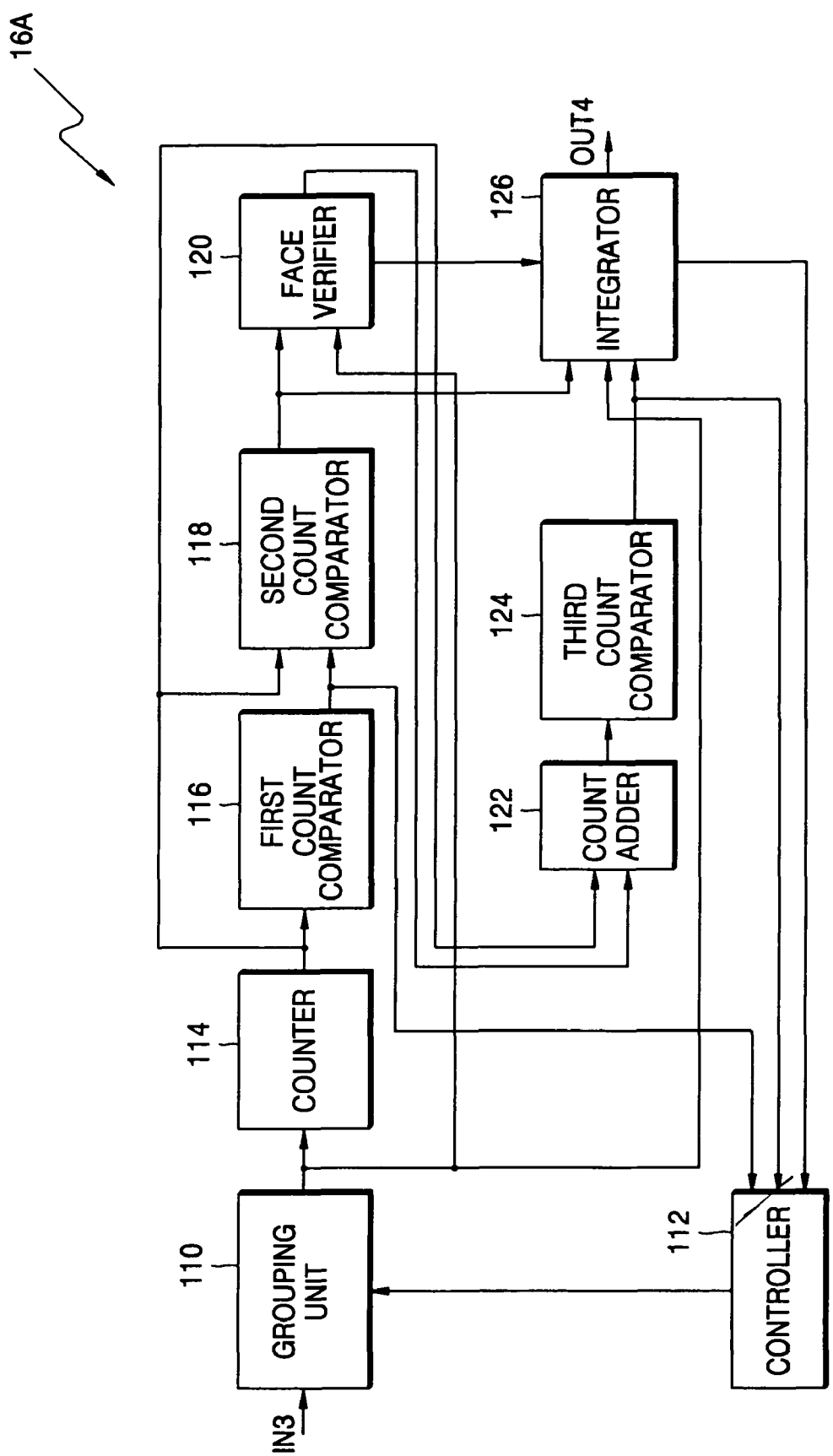
FIG. 7 is a block diagram of a post-processing unit shown in FIG. 1, according to an exemplary embodiment of the present invention.

FIG. 7 is a block diagram of an exemplary embodiment 16A of the post-processing unit 16 shown in FIG. 1. The post-processing unit 16A includes a grouping unit 110, a controller 112, a counter 114, first, second, and third count comparators 116, 118, and 124, a face verifier 120, a count adder 122, and an integrator 126.

Figure 8:
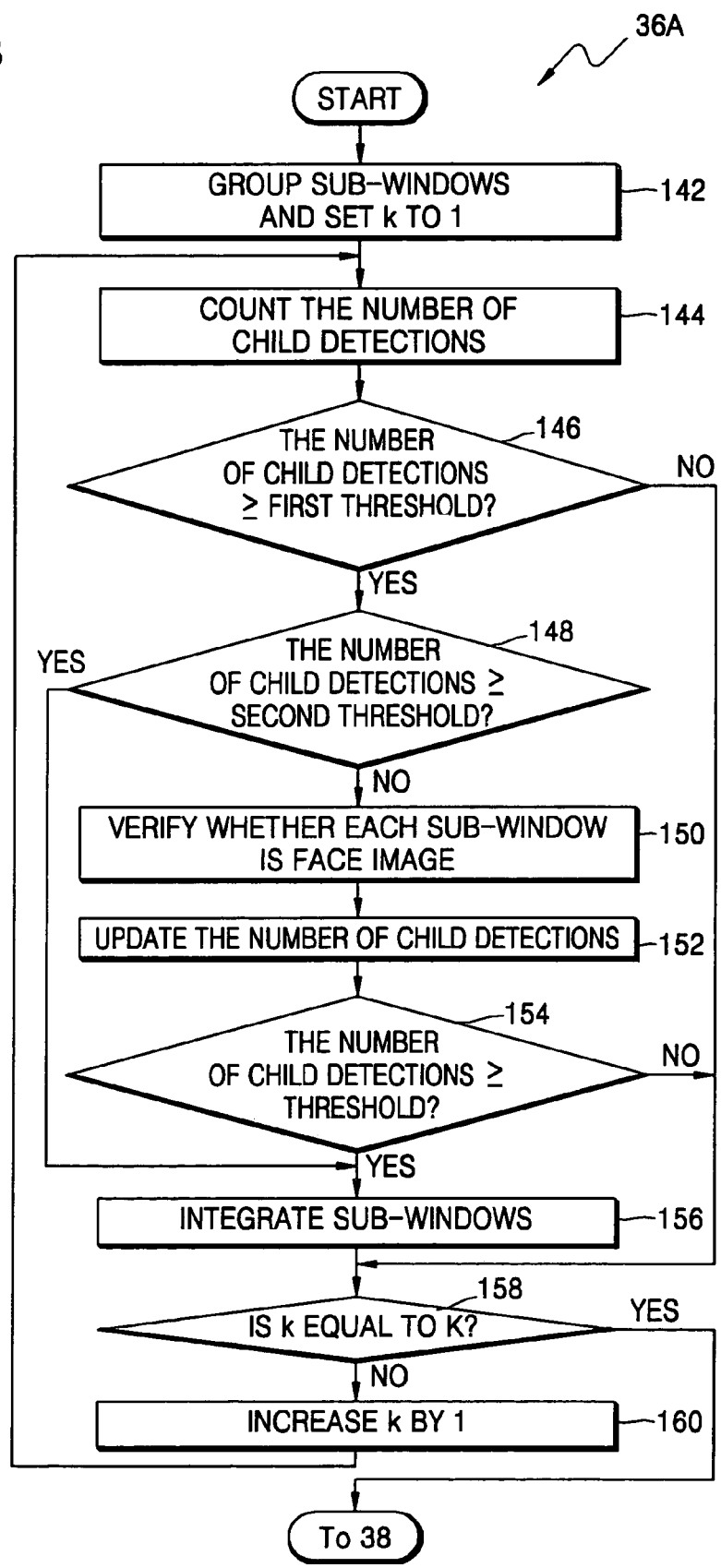
FIG. 8 is a flowchart of operation 36 shown in FIG. 2, according to an exemplary embodiment of the present invention.

FIG. 8 is a flowchart of an exemplary embodiment 36A of operation 36 shown in FIG. 2, according to the present invention. Operation 36A includes grouping sub-windows in operation 142 and verifying and integrating the sub-windows in a group in operations 144 through 160.

The grouping unit 110 receives sub-windows stored in, for example, the window storage unit 66 of the sub-window detection unit 14 through an input terminal IN3 and groups the received sub-windows into a plurality of groups in operation 142. In operation 142, the controller 112 initializes an index k indicating a first group to "1" and outputs the result of the initialization as a control signal to the grouping unit 110. In response to the control signal, the grouping unit 110 selects a k(=1)-th group from among the plurality of groups. In other words, the grouping unit 110 groups the sub-windows into the plurality of groups, selects one among the plurality of groups in response to the control signal, and outputs the selected group to the counter 114, the face verifier 120, and the integrator 126.

After operation 142, the counter 114 counts the number of sub-windows included in the group selected by the grouping unit 110 and outputs the number of child detections of the group to the first count comparator 116 in operation 144. The number of child detections may be different between groups.

Figure 9:
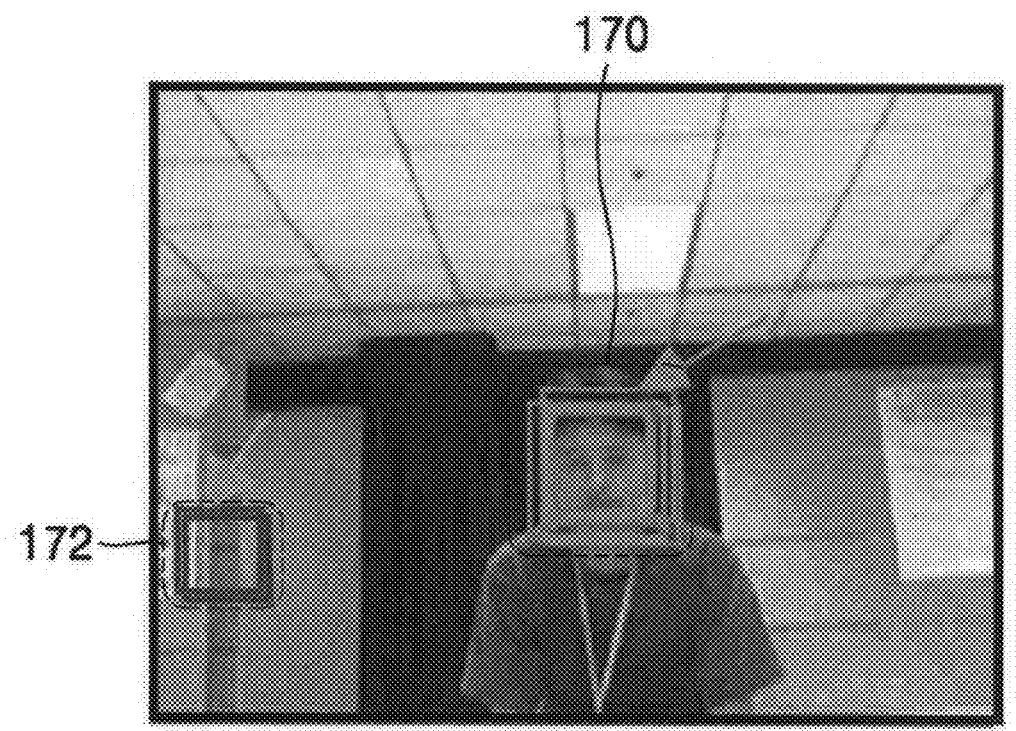
FIG. 9 is a diagram for explaining a grouping unit and a counter shown in FIG. 7.

FIG. 9 is a diagram for explaining the grouping unit 110 and the counter 114. Reference numerals 170 and 172 denote a first group and a second group, respectively.

When an image shown in FIG. 9 is divided into a plurality of sub-windows by the image dividing unit 12, it is assumed that the sub-window detection unit 14 has stored sub-windows in the first and second groups 170 and 172 as a face image. The grouping unit 110 receives the sub-windows shown in FIG. 9 from the window storage unit 66 and groups the sub-windows into the first and second groups 170 and 172. Then, the counter 114 counts the number of sub-windows included in each of the first and second groups 170 and 172.

After operation 144, the first count comparator 116 compares the number of child detections of the k-th group, received from the counter 114, with a first threshold and outputs the result of the comparison to the second count comparator 118 and the controller 112 in operation 146. In detail, the first count comparator 116 determines whether the number of child detections of the k-th group is at least the first threshold.

When it is recognized through the result of the comparison received from the first count comparator 116 that the number of child detections of the k-th group is less than the first threshold, the controller 112 determines whether "k" is equal to K in operation 158. Here, K is the total number of groups generated by the grouping unit 110. In other words, when it is recognized through the result of the comparison received from the first count comparator 116 that the number of child detections of the k-th group is less than the first threshold, the controller 112 determines whether all groups have been subjected to verification. When it is determined that "k" is not equal to K, the controller 112 increases "k" by 1, generates a control signal corresponding to the increased "k", and outputs the control signal to the grouping unit 110, in operation 160. Then, the grouping unit 110 selects a k(=2)-th group and outputs the k-th group to the counter 114, the face verifier 120, and the integrator 126.

With such operations, the method shown in FIG. 8 can be performed with respect to all of the groups.

In response to the result of the comparison from the first count comparator 116, the second count comparator 118 compares the number of child detections of the k-th group with a second threshold and outputs the result of the comparison to the face verifier 120 and the integrator 126 in operation 148. Here, the second threshold is greater than the first threshold. When it is recognized through the result of the comparison received from the first count comparator 116 that the number of child detections of the k-th group is at least the first threshold, the second count comparator 118 determines whether the number of child detections of the k-th group is at least the second threshold.

In an exemplary embodiment of the present invention, the first and second thresholds used in the first and second count comparators 116 and 118, respectively, may be proportional to a sub-window size and less than the average number of child detections. Here, the sub-window size indicates the mean of the sizes of sub-windows included in the k-th group. The average number of child detections can be defined by Equation 9.

$$D_A = \frac{\sum_{k=1}^{K} m_k}{K}, \quad (9)$$

where $D_A$ is the average number of child detections, and $m_k$ is the number of sub-windows included in the k-th group among K groups.

Figure 10:
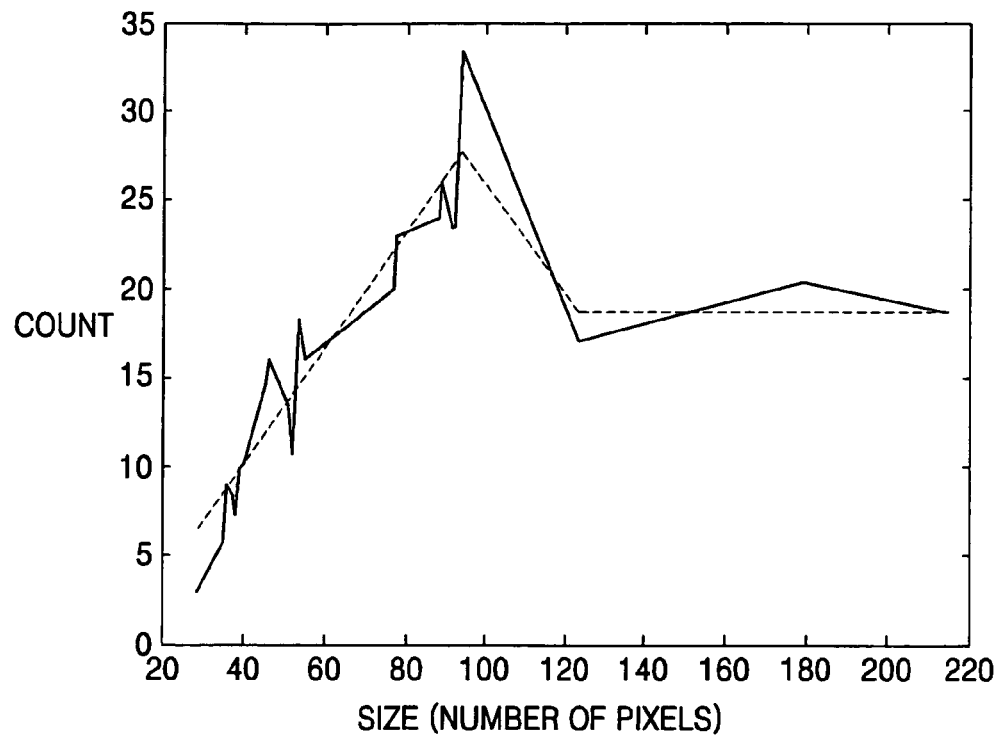
FIG. 10 is a graph of the size of a sub-window versus the average number of child detections in an exemplary embodiment of the present invention.

FIG. 10 is a graph of the sub-window size versus the average number of child detections in an exemplary embodiment of the present invention. The graph can be obtained through an experiment. The horizontal axis is the sub-window size expressed as the number of pixels and the vertical axis is the number of child detections. The solid line is the average number of child detections and the dotted line is a regression curve. Generally, when the sub-window size increases, the number of child detections also increases, as show in FIG. 10. If the first and second thresholds are fixed, the number of child detections as a face image increases when the sub-window size increases. As a result, a false detection rate increases. However, when the first and second thresholds vary with the sub-window size and the average number of child detections, a false detection rate can be reduced at a desired target detection rate.

When it is recognized through the result of the comparison received from the second count comparator 118 that the number of child detections of the k-th group is less than the second threshold, the face verifier 120 verifies whether each of the sub-windows included in the selected k-th group is a face image using the latter part of the classifiers and outputs the result of the verification to the count adder 122 in operation 150.

Figure 11:
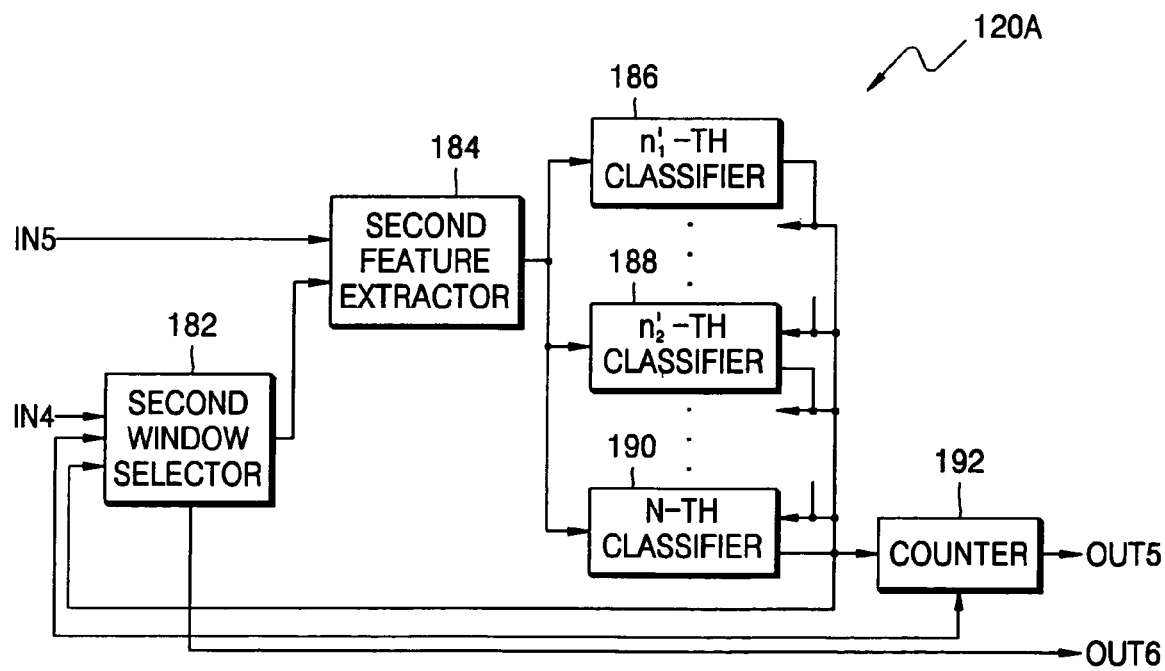
FIG. 11 is a block diagram of a face verifier shown in FIG. 7, according to an exemplary embodiment of the present invention.

FIG. 11 is a block diagram of an exemplary embodiment 120A of the face verifier 120 shown in FIG. 7, according to the present invention. The face verifier 120A includes a second window selector 182, a second feature extractor 184, $n'_1$-th, ..., $n'_2$-th, ..., and N-th classifiers 186, ..., 188, ..., and 190, and a counter 192. The $n'_1$-th through $n'_2$-th classifiers 186 through 188 operate in the same manner as the $n_1$-th through $n_2$-th classifiers 62 through 64 shown in FIG. 5, with the exception that a feature input to the $n'_1$-th through $n'_2$-th classifiers 186 through 188 is different from that input to the $n_1$-th through $n_2$-th classifiers 62 through 64. Consequently, the conventional AdaBoost face detection method uses all of the first through N-th classifiers shown in FIGS. 5 and 6 to detect a sub-window considered as a face image.

Figure 12:
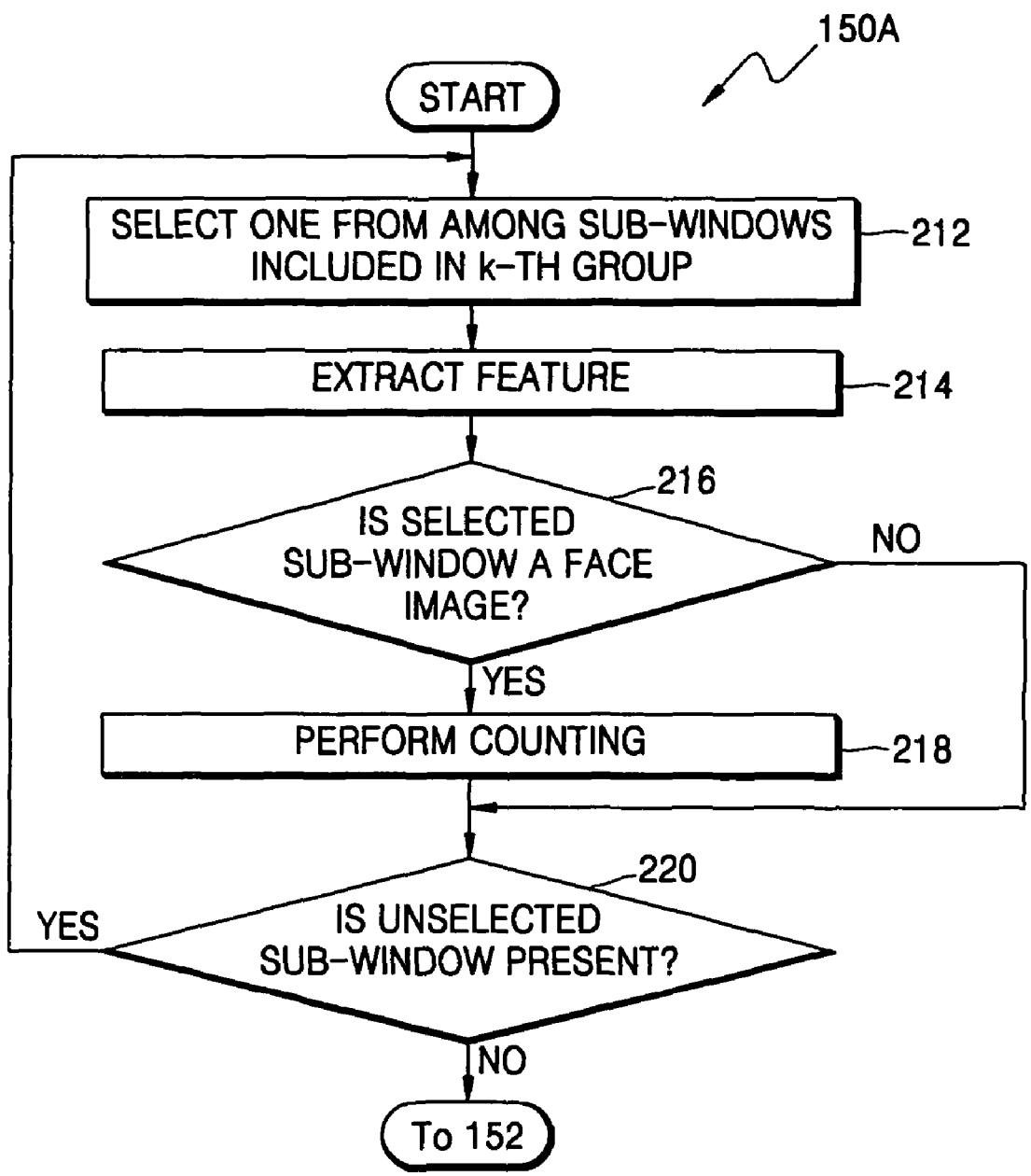
FIG. 12 is a flowchart of operation 150 shown in FIG. 8, according to an exemplary embodiment of the present invention.

FIG. 12 is a flowchart of an exemplary embodiment 150A of operation 150 shown in FIG. 8, according to the present invention. Operation 150A includes verifying whether each of the sub-windows included in the k-th group is a face image in operations 212 through 220.

When it is recognized through the result of the comparison received through an input terminal IN4 from the second count comparator 118 that the number of child detections of the k-th group is less than the second threshold, the second window selector 182 selects one from among the sub-windows included in the k-th group selected by the grouping unit 110 and outputs the selected sub-window to the second feature extractor 184 in operation 212.

After operation 212, the second feature extractor 184 symmetrically moves the feature extracted by the first feature extractor 56 shown in FIG. 5 in a vertical or horizontal direction and outputs the result of the symmetric move as a feature of the sub-window selected by the second window selector 182 to the $n'_1$-th through N-th classifiers 186 through 190 in operation 214. For this operation, the grouping unit 110 receives the feature extracted by the first feature extractor 56 through the input terminal IN3 and outputs the feature to the face verifier 120. Then, the second feature extractor 184 of the face verifier 120A receives the feature extracted by the first feature extractor 56 through an input terminal IN5. When a face to be detected is horizontally symmetric, the second feature extractor 184 symmetrically moves the feature in the vertical direction. However, when the face to be detected is vertically symmetric, the second feature extractor 184 symmetrically moves the feature in the horizontal direction. As described above, when the face to be detected is horizontally or vertically symmetric, $n'_1$ shown in FIG. 11 corresponds to $n_1$ shown in FIG. 5 and $n'_2$ shown in FIG. 11 corresponds to $n_2$ shown in FIG. 5.

Figure 13A:
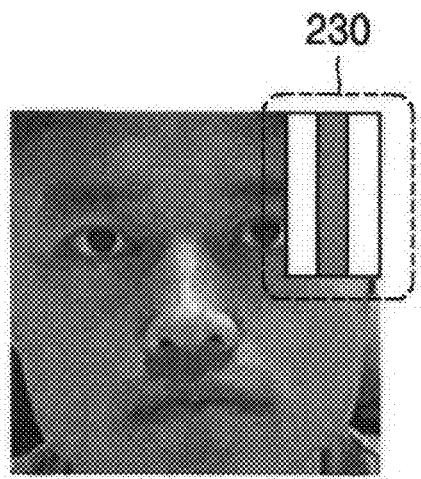
FIGS. 13A through 13D are diagrams for explaining a second feature extractor shown in FIG. 11.
Figure 13B:
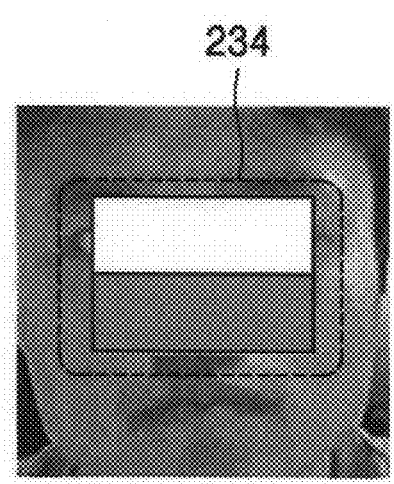
Figure 13C:
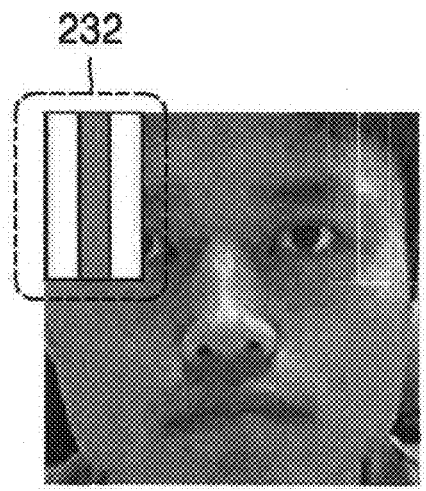
Figure 13D:
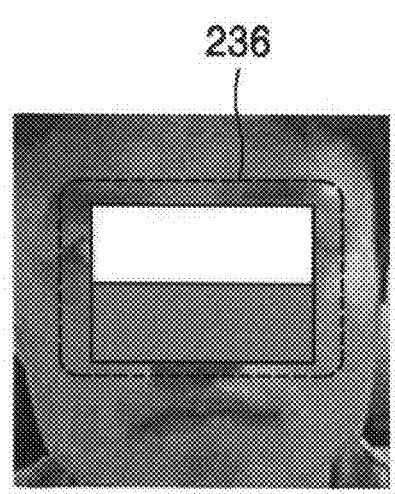

FIGS. 13A through 13D are diagrams for explaining the second feature extractor 184. FIGS. 13A and 13C illustrate features 230 and 234, respectively, extracted by the first feature extractor 56 and FIGS. 13B and 13D illustrate features 232 and 236, respectively, extracted by the second feature extractor 184.

For example, the second feature extractor 184 receives the feature 230 (FIG. 13A) extracted by the first feature extractor 56 through the grouping unit 110 and the input terminal IN5 and flips the feature 230 to generate the feature 232, as shown in FIG. 13B. Alternatively, the second feature extractor 184 receives the feature 234 extracted by the first feature extractor 56 from the grouping unit 110 through the input terminal IN5 and flips the feature 234 to generate the feature 236, as shown in FIG. 13D.

Figure 14A:
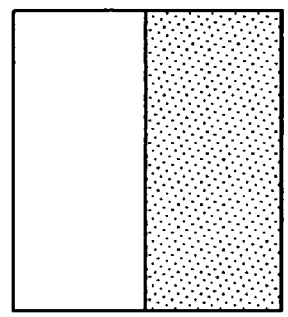
FIGS. 14A through 14C illustrate examples of formats of features shown in FIGS. 13A through 13D.
Figure 14B:
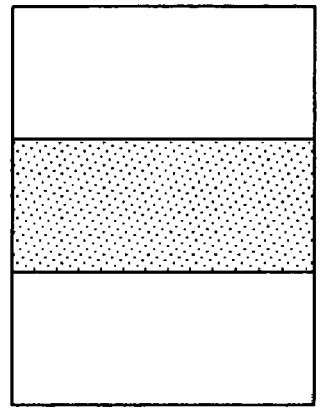
Figure 14C:
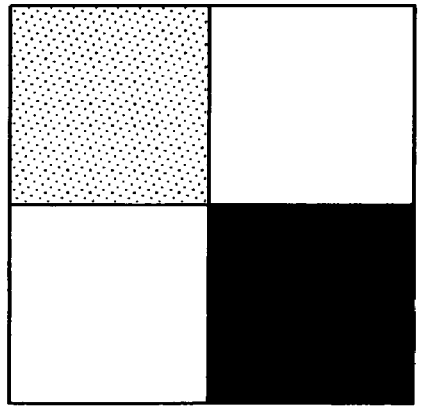

FIGS. 14A through 14C illustrate examples of formats of the features 230 through 236 shown in FIGS. 13A through 13D. For example, the format of a feature may composed of two rectangles arranged in the horizontal direction as show in FIG. 14A, three rectangles arranged in the vertical direction as shown in FIG. 14B, or four rectangles as shown in FIG. 14C.

In an exemplary embodiment of the present invention, $n'_1$ may be determined to satisfy the condition expressed by Equation 10.

$$R \leq 1 - \prod_{j=n'_1}^{N} f_j, \tag{10}$$

where $f_j$ is a false detection rate of a j-th classifier ($n'_1 \leq j \leq N$) among the latter part of the cascade of classifiers, i.e., the $n'_1$-th through N-th classifiers 186 through 190.

In another exemplary embodiment of the present invention, instead of symmetrically moving the feature extracted by the first feature extractor 56, the second feature extractor 184 may directly extract a feature from the sub-window selected by the second window selector 182 and output the extracted feature to the $n'_1$-th through N-th classifiers 186 through 190 in operation 214. In this case, $n'_1$ corresponds to $n_2+1$.

After operation 214, the latter part of the cascade of classifiers, i.e., the $n'_1$-th through N-th classifiers 186 through 190 determine whether the sub-window selected by the second window selector 182 is a face image using the feature extracted by the second feature extractor 184 in operation 216. In detail, a y-th classifier ($n'_1 \leq y \leq N$) 186, ..., 188, ..., or 190 inspects whether the sub-window selected by the second window selector 182 is a face image using the feature extracted by the second feature extractor 184. For example, the $n'_1$-th classifier 186 receives the feature extracted by the second feature extractor 184, inspects whether the sub-window selected by the second window selector 182 is a face image using the received feature, and outputs the result of the inspection to a ($n'_1+1$)-th classifier. Then, a y'-th classifier ($n'_1+1 \leq y' \leq N$) operates only when a (y'-1)-th classifier classifies the sub-window as a face image. For example, the ($n'_1+1$)-th classifier is enabled and operates only when the $n'_1$-th classifier 186 determines that the sub-window is a face image. Accordingly, only when all of the $n'_1$-th through N-th classifiers 186 through 190 classify the sub-window as a face image, that is, when the N-th classifier 190 classifies the sub-window as a face image, the sub-window is determined as a face image in operation 216.

The $n'_1$-th through N-th classifiers 186 through 190 shown in FIG. 11 operate according to the same principle as the first through $n_2$-th classifiers 58 through 64 shown in FIG. 5. In other words, the $n'_1$-th through N-th classifiers 186 through 190 generate the corresponding values with Equations 5 and 6, in which "x" is replaced with "y".

When it is recognized through the result of the inspection performed by the N-th classifier 190 that the sub-window selected by the second window selector 182 is a face image, the counter 192 performs a counting operation in operation 218. For example, when the sub-window is recognized as a face image, the counter 192 performs up-counting, for example, increase a counting value by 1.

However, when it is determined through the result of the inspection by any one of the $n'_1$-th through N-th classifiers 186 through 190 that the sub-window selected by the second window selector 182 is not a face image, the second window selector 182 determines whether a sub-window unselected by the second window selector 182 is present in the sub-windows included in the k-th group in operation 220.

After operation 218, that is, when it is recognized that the counter 192 completes the counting operation, the second window selector 182 also determines whether a sub-window unselected by the second window selector 182 is present in the sub-windows included in the k-th group in operation 220.

When it is determined that an unselected sub-window is present, the second window selector 182 selects the unselected sub-window in operation 212. However, when it is determines that no unselected sub-window is present, the counter 192 is controlled by the second window selector 182 to output the counting result to the count adder 122 as the number of sub-windows that have been verified as a face image among the sub-windows included in the k-th group. Here, the second window selector 182 outputs sub-windows that have been verified as a face image among the sub-windows included in the k-th group through the inspection of the N-th classifier 190 to the integrator 126 through an output terminal OUT6.

After operation 150, the count adder 122 adds the number of child detections received from the counter 114 and the final counting result received from the counter 192, i.e., the number of sub-windows verified by the face verifier 120 as a face image among the sub-windows included in the k-th group, and outputs the result of the addition to the third count comparator 124 in operation 152. In other words, the count adder 122 updates the number of child detections of the group using the counting result of the counter 192 in operation 152.

After operation 152, the third count comparator 124 compares the result of the addition received from the count adder 122 with the second threshold and outputs the result of the comparison to the integrator 126 and the controller 112 in operation 154. Here, the third count comparator 124 determines whether the result of the addition of the count adder 122 is at least the second threshold.

Meanwhile, when it is recognized through the result of the comparison received from the second count comparator 118 that the number of sub-windows included in the k-th group is at least the second threshold, the integrator 126 integrates the sub-windows included in the k-th group selected by the grouping unit 110 and outputs through an output terminal OUT4 the result of the integration as a face image of the k-th group included in the black and white image in operation 156. In addition, when it is recognized through the result of the comparison received from the third count comparator 124 that the result of the addition is at least the second threshold, the integrator 126 integrates the verified sub-windows received from, for example, the second window selector 182 included in the face verifier 120, and outputs through the output terminal OUT4 the result of the integration as a face image of the k-th group included in the black and white image in operation 156.

When the third count comparator 124 determines that the result of the addition, i.e., the updated number of child detections is less than the second threshold, the controller 112 determines whether "k" is equal to K in operation 158. In other words, when it is recognized through the result of the comparison received from the third count comparator 124 that the updated number of child detections is less than the second threshold, the controller 112 determines whether all groups of sub-windows have been verified. In addition, the controller 112 determines whether "k" is equal to K in operation 158 when the integrator 126 completes the integration of the sub-windows. When it is determined that "k" is not equal to K, the controller 112 increases "k" by 1, generates a control signal corresponding to the increased "k", and outputs the control signal to the grouping unit 110 in operation 160. Then, the grouping unit 110 selects an increased k-th group and outputs it to the counter 114, the face verifier 120, and the integrator 126.

Figure 15A:
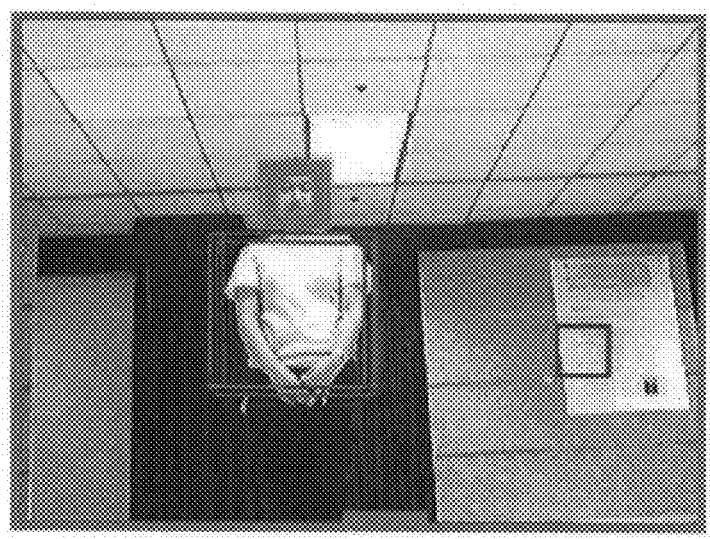
FIGS. 15A and 15B are diagrams of examples of images respectively output from the sub-window detection unit and the post-processing unit shown in FIG. 1.
Figure 15B:
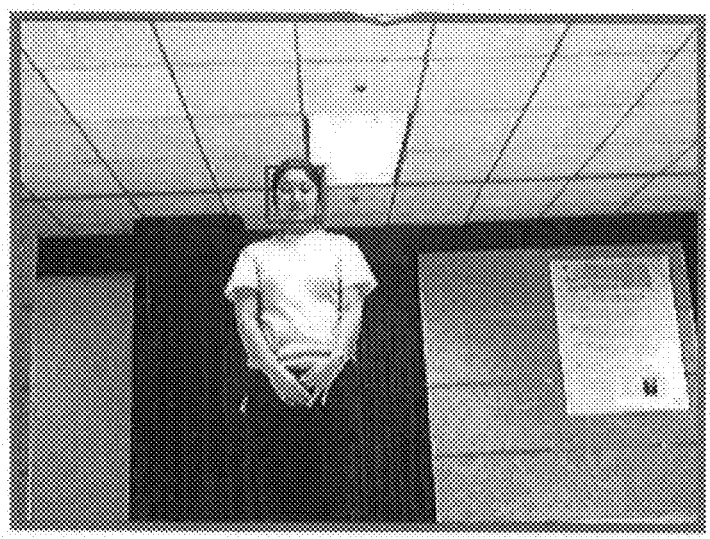

FIGS. 15A and 15B are diagrams of examples of images respectively output from the sub-window detection unit 14 and the post-processing unit 16 shown in FIG. 1.

The sub-window detector 14 show in FIG. 1 detects and outputs, for example, sub-windows shown in FIG. 15A to the post-processing unit 16. In other words, the sub-window detection unit 14 stores the sub-windows detected as a face image as shown in FIG. 15A. Then, the post-processing unit 16 verifies whether sub-windows included in each of three groups shown in FIG. 15A are a face image, integrates sub-windows according to the result of the verification, and outputs the result of the integration as a face image included in the black and white image, as shown in FIG. 15B. Two groups among the three groups shown in FIG. 15A are verified as not being a face image in the post-processing unit 16, and as the result of integrating the sub-windows included in the remaining one group, a single face image shown in FIG. 15B is output from the post-processing unit 16.

In an exemplary embodiment of the present invention, the apparatus show in FIG. 1 may further include a face storage unit 18. In this case, the method shown in FIG. 2 may further include operation 38. After operation 36, the face storage unit 18 stores information, i.e., at least one of a position and a size of the face image received from the post-processing unit 16 and outputs the result of the storing through an output terminal OUT1 in operation 38. Here, the information of the face image may be used to recognize a face.

Figure 16:
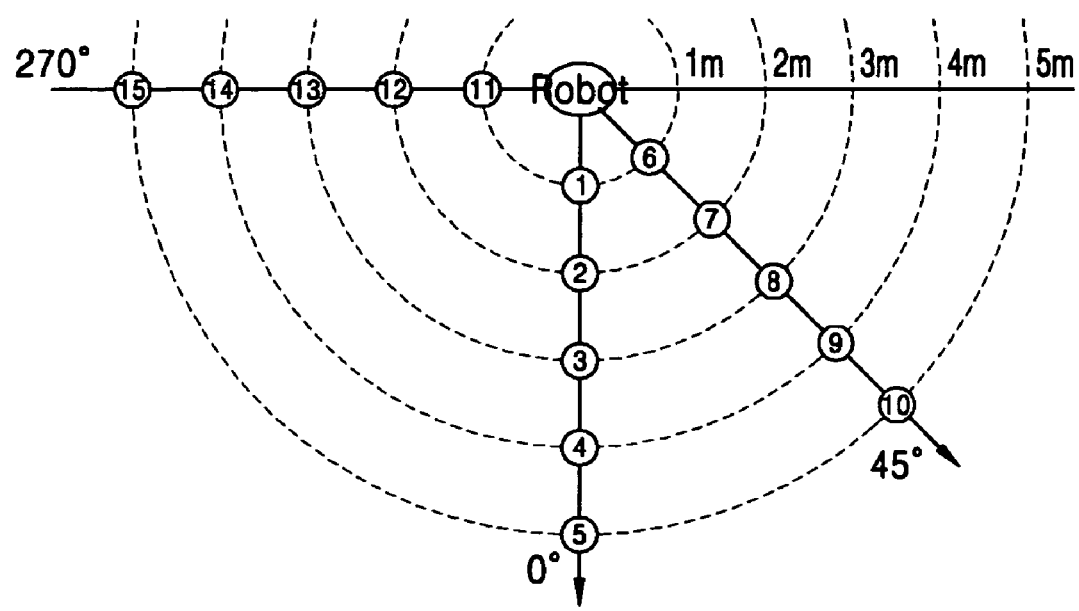
FIG. 16 illustrates an experimental environment for testing the performance of the present invention.

FIG. 16 illustrates an experiment environment for testing the performance of the present invention, where ① through ⑮ denote positions, respectively, of a user.

Referring to FIG. 16, in an experiment, an apparatus and method for detecting a face according to the present invention were applied to a robot. A photographing direction of a camera installed at the robot was set to the front (i.e., 0°) and sides (i.e., 45° and 270°) of a laboratory. A distance between the camera and a user was set to 1, 2, 3, 4, and 5 m. A size of an image of a user was set to 640×480, and 15 images of a user at the respective positions ① through ⑮ were obtained from 14 users, that is, 210 images were obtained.

In the conventional face detection method disclosed by "Viola-Jones" in U.S. Patent Publication No. 2002/0102024, 0th through 24th classifiers were used. In the present invention, the sub-window detection unit 14A used 0th through 16th classifiers and the face verifier 120A of the post-processing unit 16A used 10th through 24th classifiers. Table 1 shows comparison between the present invention and the conventional method.

TABLE 1

| | Detection method | | | |
|---|---|---|---|---|
| | DR (%) | FAR (%) | PRC (%) | F |
| Viola-Jones (0th-24th classifiers) | 95.2 | 41.4 | 69.7 | 0.805 |
| Viola-Jones (0th-16th classifiers) | 98.1 | 77.1 | 56.0 | 0.801 |
| Present invention | 98.1 | 6.2 | 94.1 | 0.960 |

Here, DR is a detection rate and is expressed by Equation 11. FAR is a false alarm rate and is expressed by Equation 12. PRC is a precision and is expressed by Equation 13. F is a harmonic mean of the PRC and the DR which have the same weight (0-1) and is expressed by Equation 14.

$$DR = \frac{\#1}{\#1 + \#2}, \quad (11)$$

where #1 is the number of faces successfully detected using the apparatus shown in FIG. 1, and #2 is the number of faces that the apparatus shown in FIG. 1 failed to detect.

$$FAR = \frac{\#3}{\#4} = \frac{\#3}{\#1 + \#2}, \quad (12)$$

where #3 is the number of backgrounds that were detected as faces by the apparatus shown in FIG. 1, i.e., the number of false detections by the apparatus shown in FIG. 1, and #4 is the number of actual faces and is the sum of the number of faces successfully detected by the apparatus shown in FIG. 1 (#1) and the number of faces that the apparatus shown in FIG. 1 failed to detect (#2), that is, #4 is the number of faces present in actual images.

$$PRC = \frac{\#1}{\#1 + \#3} \quad (13)$$

$$F = \frac{2 \times PRC \times DR}{(PRC + DR)} = \frac{\#1}{\#1 + \frac{(\#2 + \#3)}{2}} \quad (14)$$

A face detection apparatus and method according to the present invention use only front part of the cascade of classifiers to detect sub-windows considered as a face image, without using all classifiers. Accordingly, face detection time in the present invention is reduced as compared to the conventional face detection time. Since with respect to a region where a face is not clearly distinguished from a background, i.e., with respect to a group having the number of sub-windows which is at least a first threshold and is less than a second threshold, the sub-windows included in the group are verified using a flip feature, detection time slightly increases. However, since the number of sub-windows included in a verified group is usually less than 50, when the decrement of the detection time is subtracted from the increment of the verification time, face detection can be performed in the present invention with almost same period of time as in the conventional method.

As described above, in the present invention, a sub-window corresponding to a face image is detected using front part of the cascade of classifiers, thereby increasing a detection rate and a false detection rate. However, sub-windows detected as a face are verified whether they are a face image using the latter part of the cascade of classifiers, thereby decreasing the false detection rate. Accordingly, the detection rate is increased while the false detection rate is decreased as a whole. In other words, when the present invention is used, the detection rate achieved by the conventional face detection technique using an AdaBoost to provide fast detection is maintained while the false detection rate is reduced. Since sub-windows considered as a face image are primarily detected and then the detected sub-windows are verified, precision in face detection is increased. In addition, the sub-windows are verified using a flip feature, thereby providing an effect as if two types of classifiers are used without increasing face detection time. As a result, precision in face detection is increased. In addition, first and second thresholds vary with the size of the sub-windows, that is, the first and second thresholds are increased when the size of a sub-window increases, and therefore, false detection can be remarkably reduced.

The method for detecting a face in an image according to the present invention can be embodied as a computer program or set of instructions (computer program instructions). Code or code segments of the computer program can be provided by a computer programmer skilled in the art. The computer program may be stored in a computer readable medium or a plurality of computer readable media. The face detection method can be realized by reading and executing the program with a computing device such as but not limited to mobile nodes (e.g., mobile phones), robots, gates, general purpose computer, or other programmable apparatus.

The face detection method has been described with reference to examples and illustrations of methods according to exemplary embodiments of the invention. It will be understood that each block of the illustrations, and combinations of blocks in the illustrations, can be implemented by computer program instructions. These computer program instructions can be provided to a processor of a computing device to produce a machine, such that the instructions, which execute via the processor of the computing device, implement the functions specified in the block or blocks. These computer program instructions may also be stored in a computer usable or computer-readable memory that can direct a computing device to function in a particular manner, such that the instructions stored in the computer-readable memory produce an article of manufacture to implement the function specified in the flowchart block or blocks. The computer program instructions may also be loaded onto a computing device to cause a series of operational steps to be performed on the computing device to produce a computer implemented process such that the instructions that execute on the computing device provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in reverse order, depending on the functionality involved.

In addition, it should also be noted that the computer program instructions of the face detection method may be implemented by a plurality of processors in one computing device or by a plurality of computer devices having processors in a distributed network.

In addition, any data structures adopted in the exemplary embodiments of the present invention can be recorded on the computer-readable recording medium in various manners.

Examples of a computer-readable medium include a magnetic storage medium (e.g., a ROM, a floppy disk, or a hard disk), an optical storage medium (e.g., a CD-ROM or a DVD, and a carrier wave or digital transmission medium (e.g., data transmission through the Internet).

Examples of the computer-readable medium further include any type of transmission medium including networks, which may be wired networks, wireless networks or any combination thereof. The computer-readable medium may be referred to as a medium, and the medium may be distributed among computing devices as part of one or more networks or coupled with one or more networks.

One or more computing devices may be portable, i.e., mobile nodes or terminals, enabling users to access a server or network such as the Internet. The mobile nodes or terminals may include laptop computers, web pads, hand-held PCs, personal digital assistants (PDAs), mobile phones, and so on. One or more computing devices may be placed in portable, partially movable, or fixed objects such as a gate or robot.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for detecting a face in an image using classifiers generated by a boost algorithm, the apparatus comprising:

an image dividing unit dividing a black and white image into sub-windows;

a sub-window detection unit detecting a sub-window corresponding to a face image in the divided sub-windows using only a front part of a cascade of the classifiers and storing the sub-window detected as the face image; and a post-processing unit verifying whether each of sub-windows included in a group selected in response to the number of child detections in each group among a plurality of groups into which stored sub-windows are grouped is the face image using a latter part of the cascade of the classifiers and a plurality of thresholds which are proportional to a size of the sub-window and are less than the average number of child detections, integrating the sub-windows in the group according to the result of the verification, and outputting the result of the integration as the face image included in the black and white image, wherein the number of child detections is the number of sub-windows included in a group.

2. The apparatus of claim 1, further comprising an integral image computing unit generating an integral image of the black and white image and outputting the integral image to the image dividing unit, wherein the image dividing unit divides the integral image into the sub-windows.

3. The apparatus of claim 1, further comprising a face storage unit storing at least one of a position and a size of the face image received from the post-processing unit.

4. The apparatus of claim 1, wherein the sub-window detection unit comprises:

a first window selector selecting a sub-window from among the divided sub-windows;

a first feature extractor extracting a feature of the selected sub-window;

first through $n_2$-th classifiers which are the front part of the cascade of the classifiers where $n_2$ is less than a total number of the classifiers; and a window storage unit storing the selected sub-window in response to the result of inspection performed by the $n_2$-th classifier, an x-th classifier inspects whether the selected sub-window is the face image using the feature extracted by the first feature extractor where $1 \leq x \leq n_2$, and the first window selector selects another sub-window from among the divided sub-windows in response to the result of the inspection performed by the first through $n_2$-th classifiers.

5. The apparatus of claim 4, wherein the sub-window detection unit further comprises:

a variance calculator calculating a variance of the selected sub-window; and a variance comparator comparing the calculated variance with a predetermined value, and the first feature extractor extracts the feature of the selected sub-window in response to the result of the comparison received from the variance comparator.

6. The apparatus of claim 5, wherein the predetermined value is 400.

7. The apparatus of claim 5, wherein the variance calculator calculates the variance using the following equation:

$$V = \frac{sqsum}{A} - M^2,$$

where V is a variance, A is an area of the selected sub-window, sqsum is the sum of squares of respective pixel values in the selected sub-window, and M is a mean of the selected sub-window and is expressed by S/A where S is the sum of the pixel values in the selected sub-window.

8. The apparatus of claim 4, wherein $n_2$ is determined according to the following condition:

$$D_d \leq \prod_{i=1}^{n_2} d_i,$$

where $D_d$ is a target detection rate for the sub-window, and $d_i$ is a detection rate of an i-th classifier among the classifiers.

9. The apparatus of claim 4, wherein $n_2$ is determined according to the following condition:

$$\frac{F_d}{(1-R)} \geq \prod_{i=1}^{n_2} f_i,$$

where $F_d$ is a target false detection rate for the sub-window, R is a target rate at which false detection is removed, and $f_i$ is a false detection rate of an i-th classifier among the classifiers where $1 \leq i \leq n_2$.

10. The apparatus of claim 1, wherein the post processing unit further comprises:

a grouping unit grouping the stored sub-windows into the plurality of groups, and selecting and outputting the plurality of groups one by one in response to a control signal;

a counter counting the number of child detections of a selected group;

a first count comparator comparing the number of child detections with a first threshold;

a second count comparator comparing the number of child detections with a second threshold in response to the result of the comparison received from the first count comparator;

a face verifier verifying whether each of the sub-windows included in the selected group is the face image using the latter part of the cascade of classifiers in response to the result of the comparison received from the second count comparator and outputting the result of the verification;

a count adder adding the number of child detections and the number of sub-windows verified as the face image by the face verifier among the sub-windows included in the selected group;

a third count comparator comparing the result of the addition with the second threshold;

an integrator integrating the sub-windows included in the selected group in response to the result of the comparison received from one of the second and third count comparators and outputting the result of the integration as the face image included in the black and white image; and a controller generating the control signal, and the second threshold is greater than the first threshold.

11. The apparatus of claim 10, wherein the face verifier comprises:

a second window selector selecting a sub-window from among the sub-windows included in the selected group in response to the result of the comparison received from the second count comparator;

a second feature extractor extracting a feature of the sub-window selected by the second window selector;

$n'_1$-th through N-th classifiers which are the latter part of the cascade of the classifiers where N is the total number of the classifiers; and a counter performing a counting operation in response to the result of inspection performed by the N-th classifier and outputting the result of the counting operation to the count adder, a y-th classifier inspects whether the sub-window selected by the second window selector is the face image using the feature extracted by the second feature extractor where $n'_1 \leq y \leq N$, and the second window selector selects another sub-window from among the sub-windows included in the selected group in response to the result of the inspection performed by the n'$_1$-th through N-th classifiers.

12. The apparatus of claim 1, wherein
the average number of child detections is defined by:

$$D_A = \frac{\sum_{k=1}^{K} m_k}{K},$$

where $D_A$ is the average number of child detections, K is a total number of the groups, and $m_k$ is the number of sub-windows included in a k-th group among the K groups.

13. The apparatus of claim 11, wherein n'$_1$ is determined according to the following condition:

$$R \leq 1 - \prod_{j=n'_1}^{N} f_j,$$

where R is a target rate at which false detection is removed, and $f_j$ is a false detection rate of a j-th classifier among the latter part of the cascade of the classifiers where n'$_1 \leq j \leq N$.

14. The apparatus of claim 11, wherein the second feature extractor symmetrically moves the feature extracted by the first feature extractor in one of a horizontal direction and a vertical direction and outputs the result of the move as the feature of the sub-window selected by the second window selector.

15. The apparatus of claim 14, wherein the front part of the cascade of the classifiers partially overlap the latter part of the cascade of the classifiers.

16. A method of detecting a face in an image using classifiers generated by a boost algorithm, the method comprising the operations of:
   (a) dividing a black and white image, which is received by the apparatus for detecting the face in the image, into sub-windows;
   (b) detecting sub-windows corresponding to a face image in the divided sub-windows using only a front part of a cascade of the classifiers and storing the sub-windows detected as the face image; and
   (c) verifying, performed by a processor, whether each of sub-windows included in a group selected in response to the number of child detections in each group among the plurality of groups into which the stored sub-windows are grouped is the face image using a latter part of the cascade of the classifiers and a plurality of thresholds which are proportional to a size of the sub-window and are less than the average number of child detections, integrating the sub-windows in the group according to the result of the verification, and determining the result of the integration as the face image included in the black and white image,
   wherein the number of child detections is the number of sub-windows included in a group.

17. The method of claim 16, further comprising:
generating an integral image of the black and white image, wherein the operation (a) comprises dividing the integral image into the sub-windows.

18. The method of claim 16, further comprising storing at least one of a position and a size of the face image resulting from the integration.

19. The method of claim 16, wherein the operation (b) comprises:
   (b1) selecting a sub-window from among the divided sub-windows;
   (b2) extracting a feature of the selected sub-window;
   (b3) determining whether the selected sub-window is the face image based on the extracted feature in first through $n_2$-th classifiers which are the front part of the cascade of the classifiers where $n_2$ is less than a total number of the classifiers;
   (b4) when it is determined that the selected sub-window is the face image, storing the selected sub-window; and
   (b5) determining whether an unselected sub-window is present in the divided sub-windows, performing (b1) when it is determined that an unselected sub-window is present, and performing (c) when it is determined that no unselected sub-window is present.

20. The method of claim 19, wherein the operation (b) further comprises:
obtaining a variance of the selected sub-window;
determining whether the variance is greater than a predetermined value; and
when it is determined that the variance is greater than the predetermined value, extracting the feature of the selected sub-window.

21. A method of claim 16, wherein the operation (c) further comprises:
   (c1) grouping the stored sub-windows into the plurality of groups and selecting and outputting the plurality of groups one by one in response to a control signal;
   (c2) counting the number of child detections of a selected group;
   (c3) determining whether the number of child detections of a selected k-th group is at least a first threshold;
   (c4) when it is determined that the number of child detections of the k-th group is at least the first threshold, determining whether the number of child detections of the k-th group is at least a second threshold;
   (c5) when it is determined that the number of child detections of the k-th group is less than the second threshold, verifying whether each of the sub-windows included in the k-th group is the face image using the latter part of the cascade of the classifiers;
   (c6) adding the number of child detections and the number of sub-windows verified as the face image among the sub-windows included in the k-th group;
   (c7) determining whether the result of the addition is at least the second threshold;
   (c8) when it is determined that one of the number of child detections of the k-th group and the result of the addition is at least the second threshold, integrating the sub-windows included in the k-th group and determining the result of the integration as the face image of the k-th group included in the black and white image;
   (c9) determining whether "k" is equal to K where K is a total number of the groups; and
   (c10) when it is determined that "k" is not equal to K, increasing "k" by 1 and performing (c3).

22. The method of claim 21, wherein (c5) comprises:
   (c51) when it is determined that the number of child detections of the k-th group is less than the second threshold, selecting a sub-window from among the sub-windows included in the k-th group;
   (c52) extracting a feature of the sub-window selected in (c51);
   (c53) determining whether the sub-window selected in (c51) is the face image based on the feature extracted in (c52) in $n'_1$-th through N-th classifiers which are the latter part of the cascade of classifiers where N is the total number of the classifiers;

(c54) when it is determined that the sub-window selected in (c51) is the face image, performing a counting operation; and (c55) determining whether an unselected sub-window is present in the sub-windows included in the k-th group, when it is determined that an unselected sub-window is present, another sub-window is selected in (c51), and when it is determined that no unselected sub-window is present, the result of the counting operation is used as the number of sub-windows verified as the face image in (c6).

23. The method of claim 22, wherein (c52) comprises:
symmetrically moving the feature extracted in (b2) in one of a horizontal direction and a vertical direction; and
determining the result of the move as the feature of the sub-window selected in (c51).

24. At least one computer readable medium for storing instructions that control at least one processor which executes a method of detecting a face in an image using classifiers generated by a boost algorithm, the computer readable medium including tangible computer readable storage media and excluding intangible transitory media, wherein the method comprises:
(a) dividing a black and white image into sub-windows;
(b) detecting sub-windows corresponding to a face image in the divided sub-windows using only a front part of a cascade of the classifiers and storing the sub-windows detected as the face image; and
(c) verifying whether each of sub-windows included in a group selected in response to the number of child detections in each group among the plurality of groups into which the stored sub-windows are grouped is the face image using a latter part of the cascade of the classifiers and a plurality of thresholds which are proportional in size of the sub-window and are less than the average number of child detections, integrating the sub-windows in the group according to the result of the verification, and determining the result of the integration as the face image included in the black and white image,
wherein the number of child detections is the number of sub-windows included in a group.

25. The medium of claim 24, further comprising:
generating an integral image of the black and white image,
wherein the operation (a) comprises dividing the integral image into the sub-windows.

26. The medium of claim 24, further comprising storing at least one of a position and a size of the face image resulting from the integration.

27. The medium of claim 24, wherein the operation (b) comprises:
(b1) selecting a sub-window from among the divided sub-windows;
(b2) extracting a feature of the selected sub-window;
(b3) determining whether the selected sub-window is the face image based on the extracted feature in first through $n_2$-th classifiers which are the front part of the cascade of the classifiers where $n_2$ is less than a total number of the classifiers;
(b4) when it is determined that the selected sub-window is the face image, storing the selected sub-window; and
(b5) determining whether an unselected sub-window is present in the divided sub-windows, performing (b1) when it is determined that an unselected sub-window is present, and performing (c) when it is determined that no unselected sub-window is present.

* * * * *